(No Model.) 2 Sheets—Sheet 1.

T. BIRCH.
WHEEL RIM FOR PNEUMATIC TIRES.

No. 528,411. Patented Oct. 30, 1894.

Witnesses
C. T. Snyder
Edw. P. Schwarz

Inventor
Thomas Birch
by Herbert W. Jenner
Attorney (No Model.) 2 Sheets—Sheet 2.

T. BIRCH.
WHEEL RIM FOR PNEUMATIC TIRES.

No. 528,411. Patented Oct. 30, 1894.

Witnesses
C. T. Snyder
Edw. P. Schwartz

Inventor
Thomas Birch
by Herbert W. T. Jenner
Attorney.

UNITED STATES PATENT OFFICE.

THOMAS BIRCH, OF LEEDS, ENGLAND.

WHEEL-RIM FOR PNEUMATIC TIRES.

SPECIFICATION forming part of Letters Patent No. 528,441, dated October 30, 1894.

Application filed March 12, 1894. Serial No. 503,341. (No model.) Patented in England July 28, 1893, No. 14,518.

*To all whom it may concern:*

Be it known that I, THOMAS BIRCH, a subject of the Queen of Great Britain, residing at Leeds, in the county of York, England, have invented new and useful Improvements in the Construction of the Rims of Wheels having Pneumatic Tires, (for which I have obtained a patent in Great Britain, No. 14,518, dated July 28, 1893,) of which the following is a specification.

My invention relates to certain improvements in the construction of the rims of wheels, such being specially applicable for cycle wheels having pneumatic tires.

The object of my invention is to provide a rim for cycle and other wheels having pneumatic tires which will not only hold the tire in its position but allow for its being removed or taken off the wheel when required. In carrying out this object I construct the said rim in two parts, one part forming the pneumatic tire portion, and a detachable part which forms the hub and spokes portion, and which can be readily attached to and detached from the tire portion as hereinafter set forth.

Figure 1:
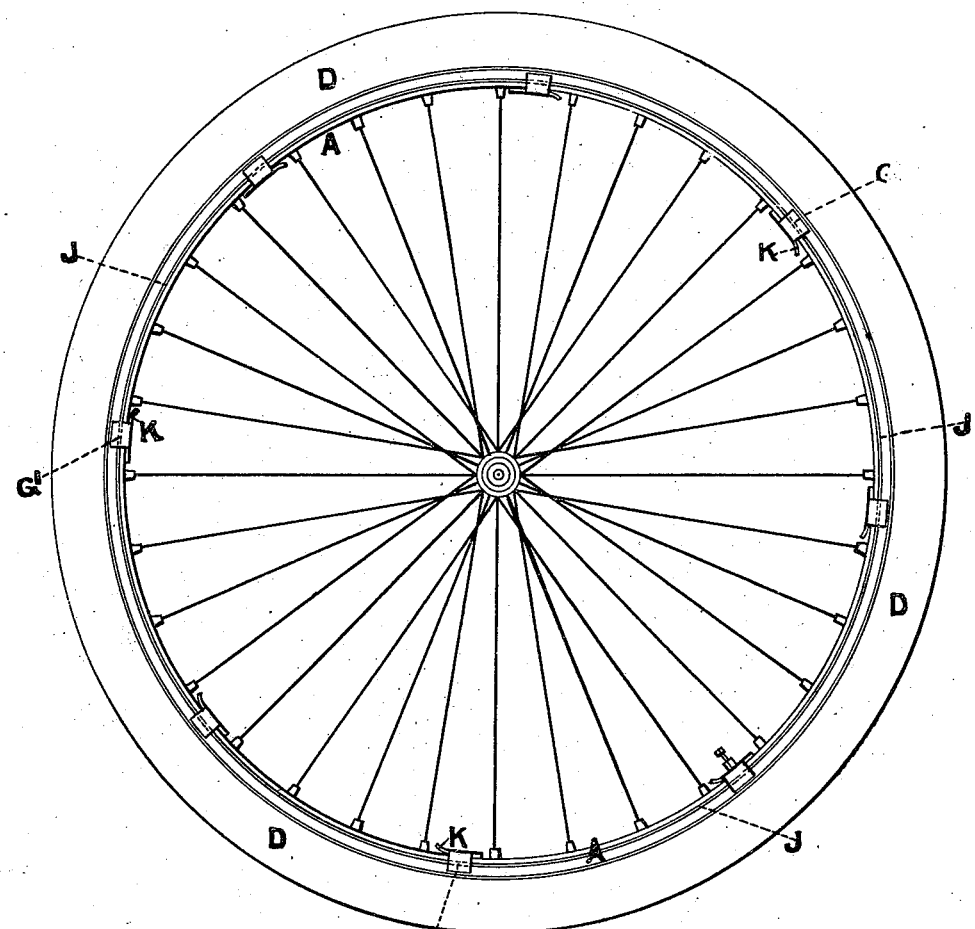
Figure 3:
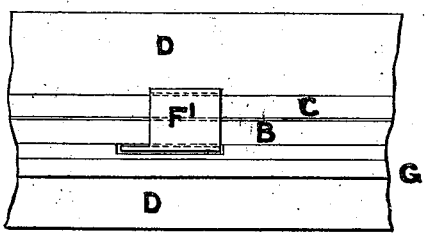
Figure 4:
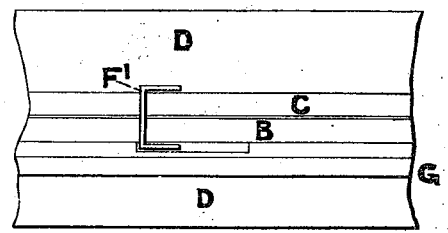
Figure 2:
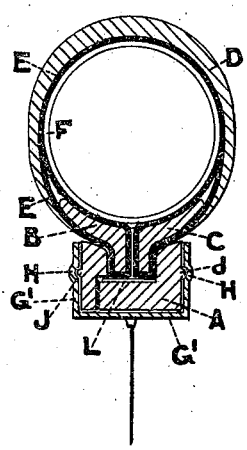
Figure 5:
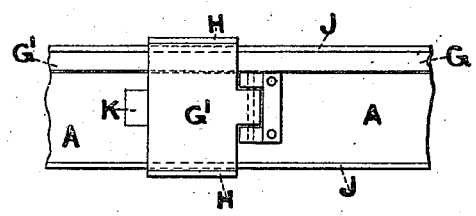
Figure 6:
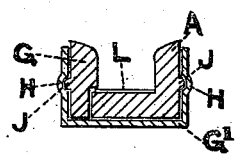
Figure 7:
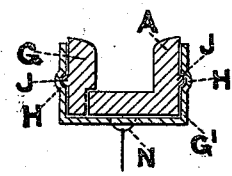

Figure 1, is a side elevation of a cycle wheel constructed according to my improvements. Fig. 2, is a section of pneumatic tire and rim. Fig. 3, is a plan of pneumatic tire portion of rim with clip in position as when securing the opening parts of this portion of the rim together. Fig. 4, is a plan of pneumatic tire portion of rim with clip turned up out of its fastening position as when opening this portion of the rim to get to the air tube. Fig. 5, is a plan of rim showing clips or fasteners for securing the detachable part to the tire part of the rim. Fig. 6 is a sectional end view of rim made of wood. Fig. 7, is a sectional end view of rim made of iron.

According to my invention the rim is built up by means of a ring or base A, which in section is in or after the form of an angle iron and secured to which are the spokes of the wheel. Resting upon the said ring or base are other rings B and C, similar in section, when combined, to a T iron, the projecting lips of which are suitably curved or rounded. To these rings B and C the tire D is secured by means of canvas E which is cemented to and passes round the inside of the tire and forms a canvas backing, and then passes round the said rings B and C to which it is also cemented, the said rings being fastened together by clips or fasteners F'. F is the air tube. The rim is completed by means of a ring G which may be either fast or loose; preferably fast.

The detachable part of the rim which consists of the two rings A and G, is secured to the tire portion by means of a series of hinged clips or fasteners G' fixed on the detachable part of the rim and which have grooves H adapted to spring or clip on to ribs J around the ring G and ring or base A.

When it is required to remove the tire portion the hinged clips or fasteners G' are turned up, by means of the lips K, on their hinges, which allows the detachable part of the rim to be readily removed.

The rim is preferably made of wood such as lance-wood and beech, or it may be made of any other suitable substance or material.

In some cases the rim may be made of iron or other suitable metal, or the tire portion may be made of wood or other suitable substance, and the detachable part of the rim of iron or other suitable metal.

The ring G may be either of wood or other suitable substance, or of metal, as preferred.

When the detachable part of the rim is made of wood it is provided with a steel band L which encircles it and strengthens it for receiving the spokes. When such detachable part is made of iron the said steel band is dispensed with and the spokes pass through a rib N upon the rim.

What I claim as my invention, and desire to secure by Letters Patent, is—

1. In a wheel, the combination, with an air tube, the two angle-shaped rings B and C, and the canvas covering inclosing the two said rings and securing them to the air tube; of a detachable portion consisting of two rings A and G adapted to engage with the adjacent parts of the rings B and C, and the hinged clips for coupling the rings A and G together, substantially as set forth.

2. In a wheel, the combination, with an air tube, the two angle-shaped rings B and C, and the canvas covering inclosing the two said rings and securing them to the air tube; of a detachable portion consisting of the two rings A and G provided with projections on their outer sides, the said ring A extending under the rings B and C and having the wheel spokes secured to it; and the coupling clips G' hinged to the ring A and engaging with the said projections, substantially as set forth.

THOMAS BIRCH.

Witnesses:
 HERBERT DUNN,
  *Royal Exchange, Leeds.*
 GEORGE SAYLES,
  *Fenton St., Leeds.*